United States Patent [19]

Wallace et al.

[11] 4,229,120
[45] Oct. 21, 1980

[54] SUBMARINE PIPELINE ALIGNMENT RIG

[75] Inventors: Kenneth W. Wallace, Gretna; Anthony V. Gaudiano, Metairie, both of La.

[73] Assignee: Taylor Diving & Salvage Co., Inc., Belle Chasse, La.

[21] Appl. No.: 941,288

[22] Filed: Sep. 11, 1978

[51] Int. Cl.³ .................... B63C 11/00; F16L 1/04
[52] U.S. Cl. .................... 405/158; 405/169; 405/193
[58] Field of Search ............ 405/158, 169, 170, 185, 405/188, 193; 254/143; 285/18, 24

[56] References Cited

U.S. PATENT DOCUMENTS

| 2,500,204 | 3/1950 | Ronay | 113/111 |
|---|---|---|---|
| 2,919,036 | 12/1959 | Raymond | 254/143 X |
| 3,204,417 | 9/1965 | Robley | 405/170 |
| 3,284,883 | 11/1966 | Haverfield | 29/200 |
| 3,407,611 | 10/1968 | Coultrup | 405/170 |
| 3,481,396 | 12/1969 | Williams et al. | |
| 3,508,410 | 4/1970 | Lynch | 405/190 |
| 3,641,777 | 2/1972 | Banjavich et al. | 405/188 |
| 3,657,786 | 4/1972 | Wiswell | 405/170 X |
| 3,658,231 | 4/1972 | Gilman | 405/170 X |
| 3,785,160 | 1/1974 | Banjavich et al. | 405/170 |
| 4,019,334 | 4/1977 | Sinclair et al. | 405/169 |
| 4,028,903 | 6/1977 | Dietrich | 405/170 |
| 4,076,130 | 2/1978 | Sumner | 405/170 X |
| 4,109,480 | 8/1978 | Sumner | 405/170 X |

Primary Examiner—David H. Corbin
Attorney, Agent, or Firm—Kenway & Jenney

[57] ABSTRACT

A submarine pipeline alignment rig includes a working section and a detachable truss section having a fixed fulcrum for engagement with a submerged conduit section. The rig also includes a vertically movable housing which provides an encapsulated underwater work space that may be positioned around the exposed end of the submerged conduit section. A manipulator mounted on the housing affects alignment of conduit sections relative to each other by pivoting them about the fixed fulcrum so that adjacent conduit sections can be connected or repaired. Locking devices avoid inadvertent release of conduit sections from the alignment rig and enhance operating safety. Both incremental and continuous vertical adjustments are provided for the locking devices of the fulcrum and the manipulator to accomodate conduits of various nominal sizes.

30 Claims, 20 Drawing Figures

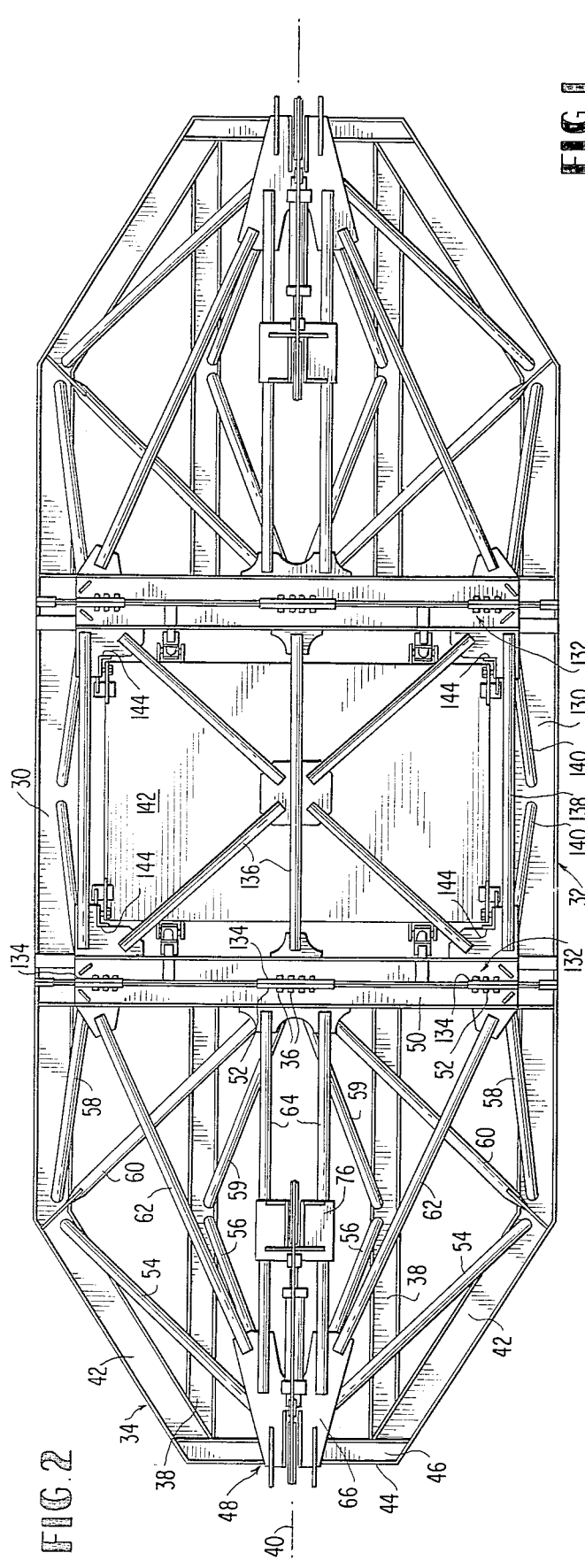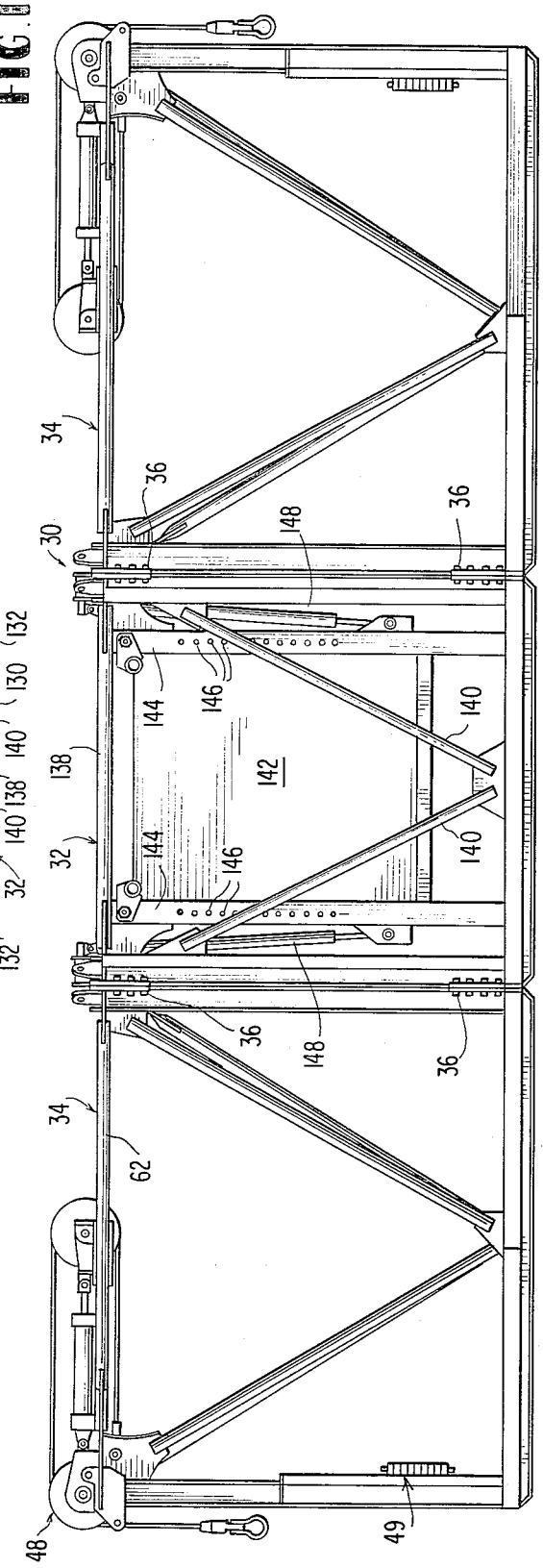

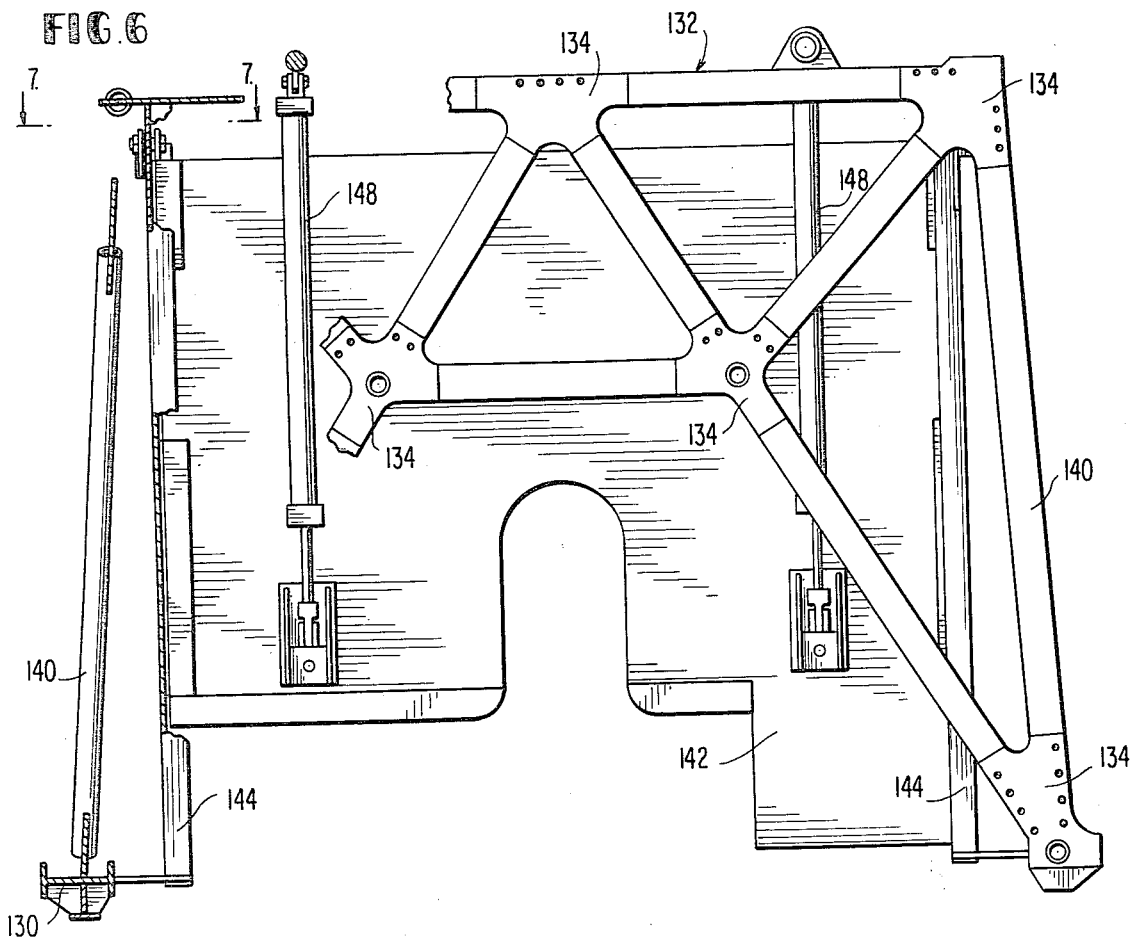
FIG.6
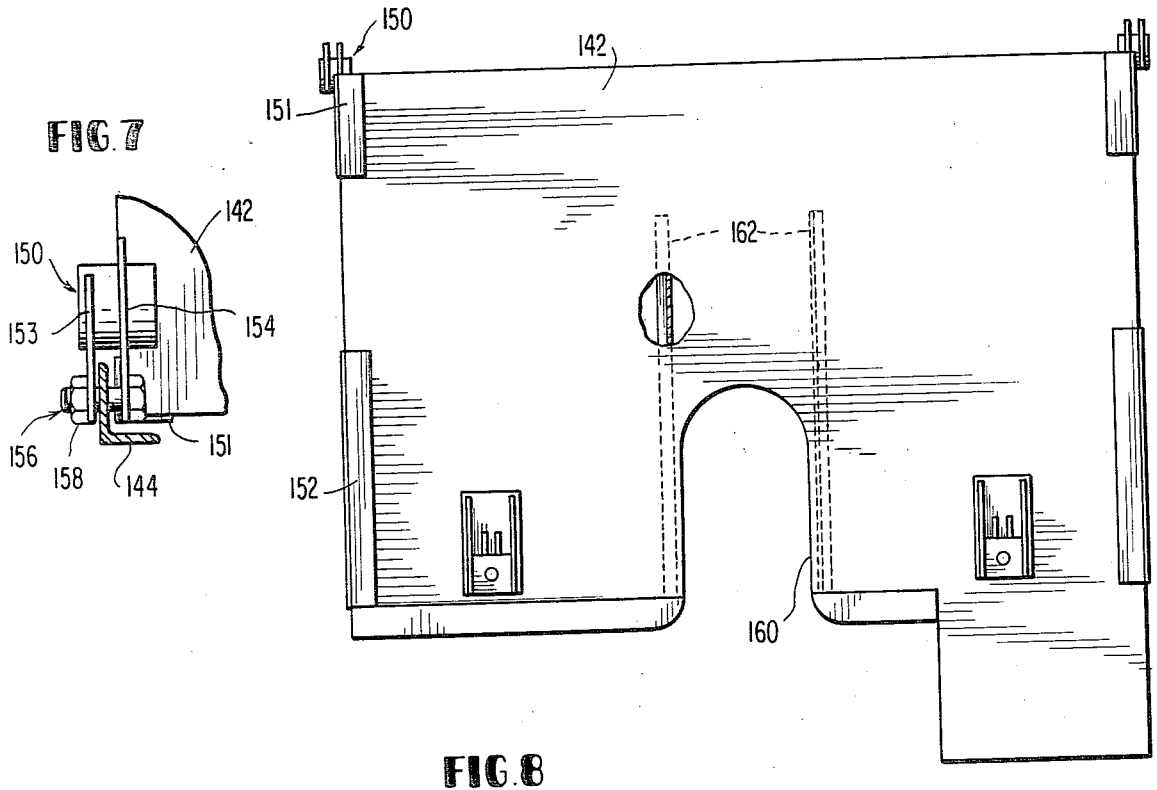
FIG.7
FIG.8

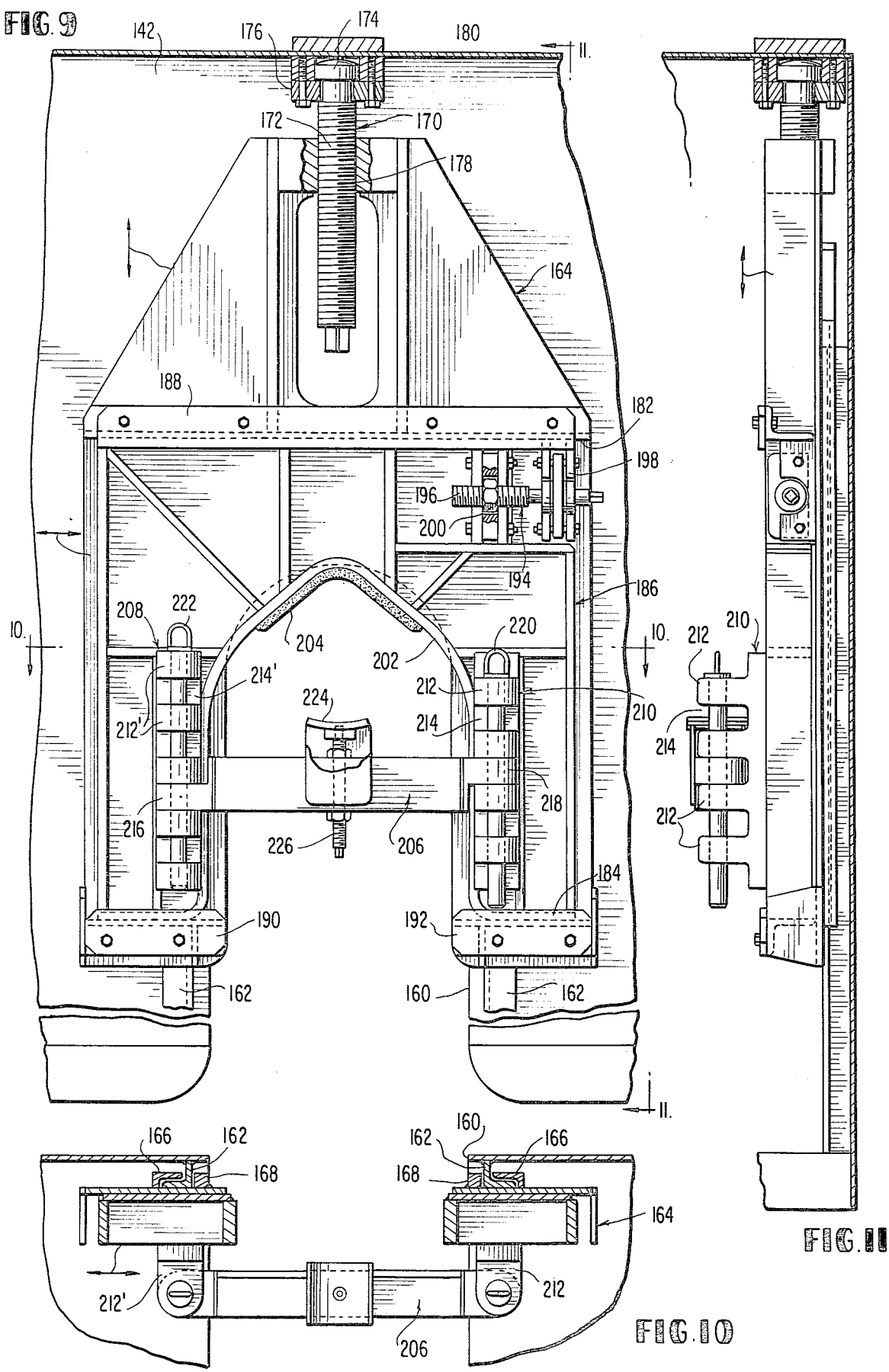

SUBMARINE PIPELINE ALIGNMENT RIG

BACKGROUND OF THE INVENTION

The present invention relates generally to apparatus for working on a submerged pipeline. More particularly, the present invention concerns apparatus for providing a submerged gaseous environment in which various operations on a submerged pipeline may be performed.

During the past decade, the practical utility of submerged pipeline alignment rigs has been demonstrated by a large number of successful underwater operations. These rigs have successfully repaired damaged pipelines, added comparatively short segments of pipe to existing pipelines, connected risers of offshore platforms with a submarine pipeline, installed lateral connections to existing pipelines and the like. These various operations have been conducted at submerged depths as great as 1,000 feet.

Even though the efficacy and utility of submarine pipeline alignment rigs has been demonstrated, there are some aspects of the use and operation of known rigs which leave room for desirable improvement. For example, existing rigs are comparatively heavy and typically require specially equipped surface vessels in order to transport and service the rigs during use. Such a need for special handling equipment may necessitate delay in making the rig operational at a desired location. While ordinarily this delay does not create an insurmountable problem, there are situations in which time is of the essence and it is necessary to promptly get the rig into an operational posture. Accordingly, it is desirable to have a comparitively lightweight rig which can be transported and serviced by an available vessel of opportunity.

One aspect of the known alignment rigs which has contributed to the comparatively great weight is the use of multiple manipulators for grasping, raising and aligning the submarine conduits by the rig. While it is necessary to manipulate the pipeline in order to effect alignment between detached sections thereof, the use of a multiple manipulators on each side of a welding module can introduce extraordinary stresses in the rig and in the pipeline itself.

The known submergible alignment rigs include a unitary structure which typically has an framework truss disposed at each end to engage and manipulate a submerged pipeline. The rig must be relatively long in order to exert the necessary forces on the submerged pipeline to effect alignment of adjacent pipeline segments. With these long structures it is difficult to use the known underwater alignment rigs near an offshore tower to effect attachment between a pipeline riser and a generally horizontally extending pipeline. Moreover, when it is necessary to repair or effect a connection to an existing submerged conduit, the length of existing rigs requires an unnecessarily long section of conduit to be exposed in order to effectively use the existing rigs.

Accordingly, it will be seen that the need continues to exist for an underwater pipeline alignment which overcomes problems of the type described above.

One presently available underwater pipeline alignment rig is discussed in U.S. Pat. No. 3,641,777, issued Feb. 15, 1972 to Banjavich et al, and U.S. Pat. No. 3,785,160 issued Jan. 15, 1974 to Banjavich et al. These Banjavich et al patents are commonly assigned with the present application and disclose a working chamber that cooperates with a submersible alignment device having four manipulators each of which engages a pipeline.

Another pipeline alignment system is disclosed in U.S. Pat. No. 3,658,231, issued Apr. 25, 1972 to Gilman. The Gilman patent discloses an A-frame structure utilizing a pull-up alignment concept in which the pipeline seats against the guiderail arcuately contoured to match the pipe diameter.

A Lynch patent, U.S. Pat. No. 3,508,410 issued Apr. 28, 1970 illustrates a rigid submersible pipeline repair system having a plurality of actuators to accomodate minor pipeline bends.

A Coultrup patent, U.S. Pat. No. 3,407,611 issued Oct. 29, 1968, illustrates a submersible working chamber without pipeline manipulating apparatus.

Other pipeline connecting systems are illustrated by U.S. Pat. No. 2,500,204 issued to Roney on Mar. 14, 1950, U.S. Pat. No. 3,284,883 issued to Haverfield et al on Nov. 15, 1966 and U.S. Pat. No. 3,481,396 issued to Williams et al on Dec. 2, 1969.

OBJECTS AND BRIEF SUMMARY OF THE INVENTION

It is a general object of the present invention to provide a submarine pipeline alignment rig which overcomes deficiencies of the known alingment rigs.

Another object of the present invention is to provide a submersible pipeline alignment rig having detachable sections that permit use of the rig in close proximity to existing underwater structures while maintaining a capacity to manipulate a conduit.

A further object of the present invention is to provide a submersible pipeline alignment rig which is substantially lighter than existing rigs and that can be transported and serviced by a large variety of surface vessels.

Yet another object is to make available a submersible alignment rig capable of handling a wide variety of nominal pipe sizes as well as securely retaining pipes of those various nominal sizes during alignment and fastening operations.

A still further object of this invention is to provide a submersible pipeline alignment rig having detachable truss sections each provided with a fulcrum assembly, hoisting assembly and a locking assembly at the end thereof, the rig also having a working section with a vertically movable housing that is provided with a pair of spaced-apart biaxially adjustable pipeline manipulators and the housing being operable to define a submerged gaseous working environment.

A submarine pipeline alignment rig which overcomes problems of the type discussed above in connection with the prior art and satisfies the above as well as numerous other objects includes a housing assembly constructed to provide a gaseous working environment under the surface and around a submerged conduit. The housing assembly preferably includes a pair of manipulators that are capable of biaxial movement transversely of the conduit in order to vertically and horizontally adjust the distal ends of conduits sections to be joined.

Each end of the housing may be provided with a detachable truss assembly having an open bottom adapted to receive a submerged conduit section in a broad range of nominal sizes. In addition, each truss assembly may be provided with a lifting mechanism connectable with a submerged conduit section and operable to raise the conduit section into engagement into the truss assembly.

In order to secure the conduit section to the truss assembly, a fulcrum assembly with a locking device is provided adjacent the outer most end of each truss assembly. A V-shaped notch of the fulcrum assembly engages the conduit which is also supported by a coarsely and finely adjustable locking device.

Each manipulator of the housing is also provided with a latching assembly for securing the conduit in fixed relation with respect to the housing assembly. The latching assembly is mounted so as to be vertically adjustable and can also accomodate conduits of various nominal sizes. By using the V-shaped slot configuration in the manipulating, the conduit end will also be contacted and supported at two circumferentially spaced positions. Moreover, by providing a conduit support surface on the latching assembly a further contact portion circumferentially spaced from the first two contact positions are effected.

BRIEF DESCRIPTION OF THE DRAWINGS

Many additional objects and advantages of the present invention will be apparent to those skilled in the art when this specification is read in conjunction with the drawings wherein like reference numerals are applied to like elements and wherein:

FIG. 1 is a front elevation of a submarine pipeline alignment rig in accordance with the present invention;

FIG. 2 is a top plan view of the rig of FIG. 1;

FIG. 6 is an end view in partial cross section of the central working section of FIG. 1;

FIG. 7 is a view in partial cross section taken along the line 7—7 of FIG. 6;

FIG. 8 is a view similar to FIG. 6 with portions removed in the interest of clarity;

FIG. 9 is an enlarged detail view of a manipulating assembly inside the housing assembly;

FIG. 10 is a partial cross sectional view taken along the line 10—10 of FIG. 9; FIG. 11 is a partial cross-sectional view taken along the line 11—11 of FIG. 9;

DESCRIPTION OF THE PREFERRED EMBODIMENTS

Figure 5:
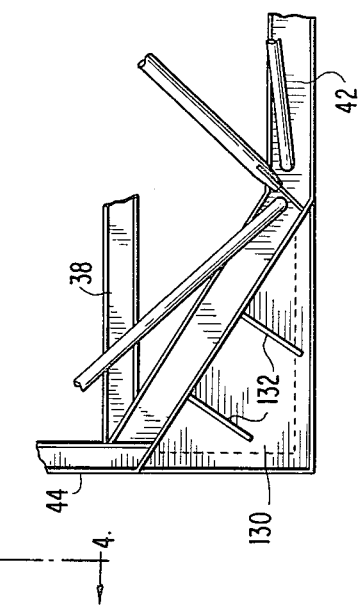
FIG. 5 is a detail view of an optional bearing surface augmenting assembly for the rig of FIG. 1.

Turning now to FIG. 1, submerged or submersible pipeline alignment rig 30 is disclosed. The rig 30 includes three detachable or severable sections: a centrally disposed working section 32 and a pair of substantially identical truss or end sections 34. Each truss section 34 is disposed on a corresponding side of the central working section 32 and is connected thereto by means of a plurality of bolts 36 passing through aligned holes of mounting plates. For convenience, each rig section 32,34 and their major features will be discussed separately.

Truss Section

As each of the two truss sections 34 are substantially identical, it will suffice to describe only one of the truss sections in detail. From FIG. 2, it will be seen that each truss section 34 includes a pair of generally parallel ground engaging supports 38 which straddle the center line 40 of the rig 30. Positioned outboard of each support 38 is a second ground engaging support 42 which is joined to the corresponding support 38 near the free or unconnected end 44 of the truss section 34. By providing the second supports 42 in an outboard location relative to the first support 38, lateral stability to the truss section 34 and thus the rig 30 itself is substantially increased. Moreover, the bearing pressure exerted by the rig 30 is reduced by virtue of the increased surface area available to support this rig.

At the first end 44 there is also a transversely extending support structure 46 that serves to space the ground engaging supports 38, 42 from one another and to support a lifting assembly 48 and a locking assembly 49 (see FIG. 1). At the other end of the truss section 34 (see FIG. 2) there is a second transverse support structure 50 having a plurality of bearing plates 52 for mating with the central working section 32. These bearing plates 52 are provided at selected locations, such as the junctions of truss stiffeners, which are conveniently accessable for detachment purposes and which facilitate force transmissions between sections 34,52. Each bearing plate has a plurality of holes to receive the bolts 36, and effect connection between the truss section 34 and the central working section 32.

In order to straddle a pipeline or other submerged conduit sections positioned along or below the rig center line 40, the ground engaging supports 38, 42 must be rigidly maintained in a spatial relationship. To this end, symmetrically disposed pairs of diagonally extending structural struts or stiffeners 54, 56 are provided to connect the transverse end structure 46 with an intermediate portion of the corresponding ground engaging supports, one strut being connected to each corresponding support 38,42. Additional pair of symmetrically disposed struts 58,59,60 support the intermediate portion of the outboard strut relative to the second transverse structure 50 in a similar manner. Additional pairs of stiffening members 62 64 extend from the first transverse structure 46 directly to the second transverse structure 50 in a generally horizontal attitude and in a symmetrical manner. As used herein, symmetrical refers to symmetry about a vertical plane containing the rig centerline 40. As may be seen from FIG. 1, the stiffening members 62, 64 define the upper edge of the truss assembly 34.

The pair of stiffening members 64 (see FIG. 2) are generally parallel to one another and spaced so as to straddle the centerline 40 of the rig 30. In order to facilitate connection of the various stiffening struts with the transverse structure 46 and avoid congestion of those struts at the first end 44, the transverse structure 46 may be provided with an attachment assembly including a generally V-shaped horizontally disposed plate 66 and buttress plates 67, 69 (see FIG. 4).

The Hoisting Assembly

Figure 3:
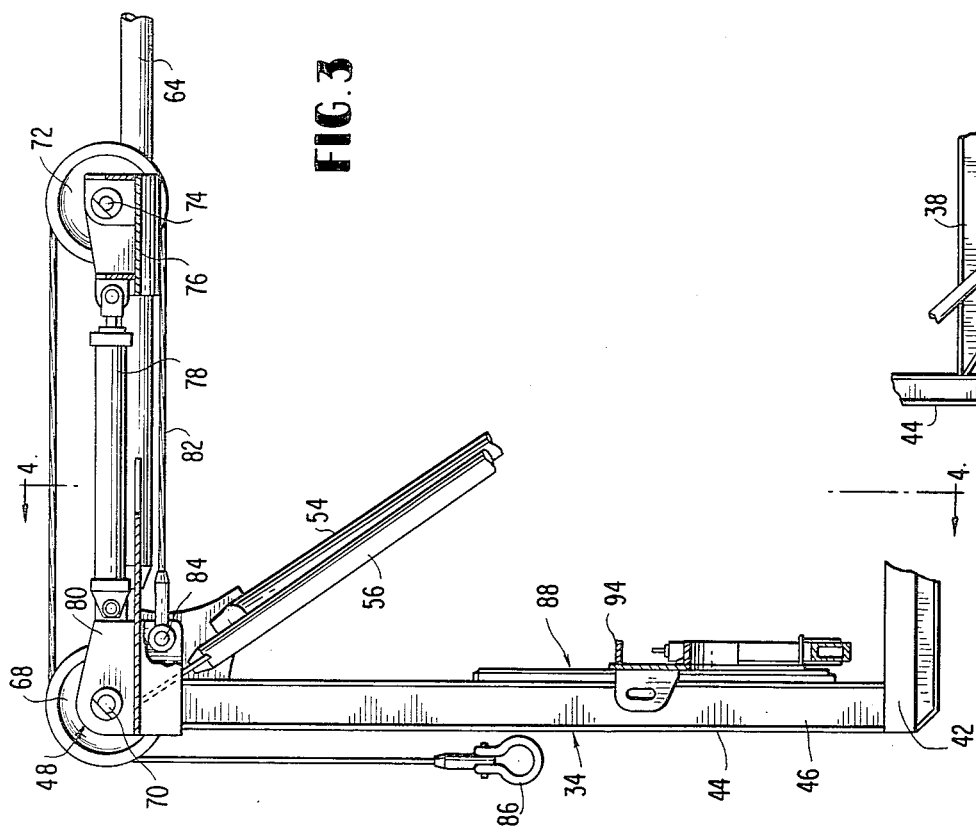
FIG. 3 is an enlarged detail view of a pipeline hoisting assembly in accordance with the present invention.

As noted above, each truss section 34 includes a hoisting assembly 48. This hoisting assembly is operable to lift a conduit section into engagement with the truss section 34 or to otherwise effect the relative vertical motion therebetween. As shown in FIG. 3, the hoisting assembly 48 includes a spatially fixed pulley 68 mounted for rotation about a generally horizontal axis 70. This first pully 68 is positioned above the transverse support 46 such that the peripheral surface end projects beyond the first end 44 (see FIG. 2). A second pulley 72 (see FIG. 3), which may be of the same diameter of the first pulley 68, is also mounted for rotation about a generally horizontal axis 74. This second pulley 72 is movable in relation to the truss assembly 34 and is carried by a guided slider 76.

The slider 76 (see FIG. 2) is mounted for sliding movement along the parallel spaced guide bars 64. An hydraulic cylinder 78 is pivotally connected at its cylinder end to a pair of vertical support plates 80 which also carry the first pulley 68. The rod of the hydraulic cylinder 78 is pivotally connected at its end to the slider 76 so that operation of the cylinder effecrs movement between the two pulleys 68,72. With the cylinder end of the hydraulic cylinder 78 connected to the fixed pulley support brackets 80, the maximum force which the cylinder 78 can generate causes an extension of the cylinder to increase the distance between the fixed pulley 68 and the movable pulley 72. Moreover, hydraulic connections to the cylinder 78 are simplified since the cylinder itself is not movable.

An inextensible flexible member 82 is dead-ended at one end 84 to the truss section 34. In addition, the flexible member 82 passes around the movable pulley 72 and the fixed pulley 68 so that the second end hangs in a generally vertically posture adjacent the first end 44 and is spaced therefrom. A suitable conventional shackle 86 may be fixed to the movable end of the flexible member 82 to facilitate connection of a lifting device. The flexible member 82 may, for example, be a wire rope having sufficient tensile strength to support the end of a conduit section.

By attaching a lifting loop around a submerged conduit section, and attaching the lifting loop to the shackle 86, it will be seen, upon extension of the hydraulic cylinder 78, the slider 76 and the movable pulley 72 moves away from the fixed pulley 68 thereby causing vertically upward motion of the shackle 86 and the attached conduit section. Accordingly, the cylinder-pulley arrangement provides a lifting assembly to hoist the conduit into engagement with the truss means 34 or to effect relative motion therebetween.

Truss Fulcrum Assembly

Positioned on the inner surfaces of the transverse beam 46 is a truss fulcrum assembly 88 which is designed to accomodate conduits of various nominal diameters and positively retain such a conduit against inadvertant release from the truss assembly 34.

The fulcrum assembly 88 (FIG. 4) is mounted on inner surface of the truss section end so that clearance between the end 44 and an adjacent structure is minimized. A backing plate 90 of the fulcrum assembly 88 is carried on the transverse frame 46. Mounted on the plate 90 is a bracket 92 having a transverse stiffening rib 94 projecting inwardly therefrom. The bracket 92 defines a generally V-shaped notch 96 opening downwardly and adapted to contact a conduit section at two circumferentially spaced locations thereof. This arrangement of the notch allows the fulcrum assembly to receive a wide range of nominal size conduits.

A bearing collar 98 is mounted adjacent to the V-shaped notch 96 and has a pair of generally perpendicularly extending braces 100, each of which is located on a corresponding side of the notch 96. The bearing plate 98 may be radiused at its central portion, it desired. Such a radius defines the minimum nominal size conduit which may be secured by the assembly 88.

Locking Assembly

In order to secure a conduit or conduit section in the V-shaped notch 96, a locking assembly is provided which extends across the downwardly open notch. The locking assembly includes a lock bar 102 which is pivotally mounted at each end to the plate 92. Each end of the lock bar 102 has a coarse vertical adjustment assembly 104; a fine vertical adjustment assembly 106 is located at an intermediate position of the bar 102.

The coarse vertical adjustment assembly includes a plurality of vertically-spaced equal-width gudgeons 108 which define a plurality of spaces 110 therebetween; the spaces 110 have a width corresponding to that of the gudgeons 108 of the lock bar. A pair of ears 112 extend from each end and straddle a gudgeon 108 while being received by corresponding spaces 110. A vertically extending pin 114 passes through the gudgeons 108 and the ears 112 to effect the pivotal connection between each end of the lock bar 102 and the corresponding coarse adjustment assembly 104.

Figure 4:
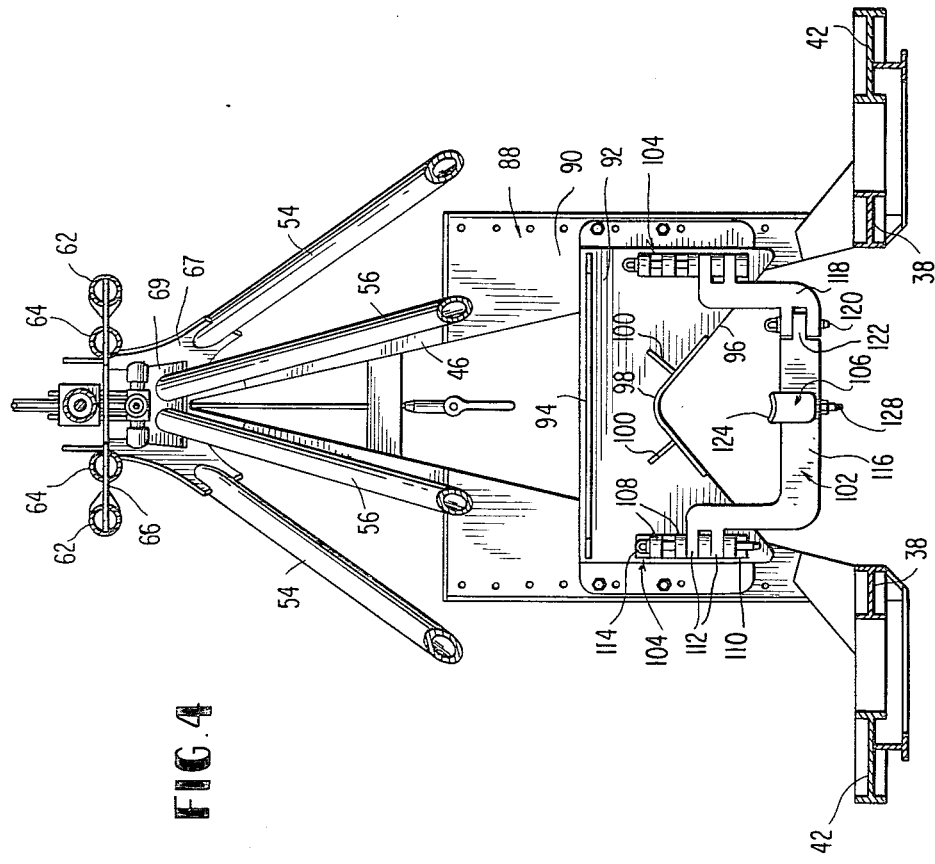
FIG. 4 is an enlarged detail view of a conduit fulcrum assembly and locking assembly taken along line 4—4 of FIG. 3.

It will be noted from FIG. 4 that the gudgeons 108 on one side of the V-shaped notch 96 are vertically offset from the gudgeons 108 on the opposite side of the notch 96. This offset distance corresponds to the width of a gudgeon 108. However, it will be noted that the lock bar 102 is generally U-shaped in cross-section and that the ears 112 on opposite sides of the notch 96 have different elevations. With this construction, the lock bar 102 can be adjusted by an integral number of vertical increments (each increment corresponding to the distance between corresponding surfaces of adjacent gudgeons 108) merely by positioning the ears 112 in other recesses 110. On the other hand, if it is desired to increase the vertical elevation of the lock bar 102 by one half of the vertical increment, the lock bar 102 may be rotated end for end about a generally vertical axis. Then, the pivotal connection effected by the pins 114 may be reestablished. By virtue of the staggered elevation of the gudgeons 108 on opposite sides of the slot 96 and the different leg lengths of the U-shaped bar 102, an elevational adjustment of one half the vertical increment is effected. This arrangement permits the lock bar 102 to be preadjusted to receive a conduit of particular nominal size without requiring an inventory of additional parts to accomodate various nominal sizes.

To prepare the locking assembly to receive a conduit, a pin 120 is removed from a clevis connection between first and sections 116, 118 of the lock bar 102. The first and second sections can then be swung laterally about a vertical axis to provide an unobstructed receptacle for the conduit.

Once the lock bar 102 has been coarsely or discretely adjusted in the vertical direction, and a conduit has been drawn into the V-shaped notch 96, the first and second sections 116, 118 are swung into alignment and the pin 120 is inserted through the clevis connection 122. In this manner, the pipeline is prevented from dropping vertically out of engagement with truss section 34. Moreover, the locking can be done without personnel being positioned below the conduit at any time thereby enhancing safety of the operation.

To further retain the conduit in the V-shaped notch, the fine or continuous vertical adjustment assembly 106 may be actuated to bring a conduit supporting plate 124 into engagement with the conduit. This adjustment is effected by turning a threaded shaft 128 that passes through the member 102 and is connected to the plate 124. When the plate has been adjusted the conduit will be supported at three circumferentially spaced locations: at two by the notch 96 and at one by the plate 124. In the foregoing manner, the conduit can be securely positioned in the fulcrum assembly against horizontal and vertical movement so as to define a fulcrum about which relative rotation between the conduit and the rig 30 may occur.

Bearing Surface Enhancement

It will be noted from FIG. 5 that each corner of the truss assembly 34 may be provided with an optional generally horizontally extending surface 130 supported on the outboard ground engaging support 42. This surface 130 may be rigidly connected or hingedly mounted and braced in position by the supports 132. By providing a surface 130 at each peripheral corner of the rig 30, additional resistance of settling of the rig 30 in the presence of weak surface conditions may be effected.

Working Section

Returning now to FIG. 2, the central working section 32 includes a pair of laterally spaced generally parallel ground engaging members 130' which are spaced apart by a pair of generally parallel end frames 132. Each end frame 132 has a plurality of bearing plates 134 each of which is generally co-terminous with the dimensions of the corresponding bearing plates 52 of the adjacent truss section 34. Accordingly, the bolts 36 effect a detachable connection between the plates 52, 134 and thus between the truss section 34 and the adjacent end frame 32 of the working section 32.

A plurality of stiffeners 136 on the top of the working section 132 space the transverse frames 132 relative to one another at the upper edge while the supports 130 space the bottom edges. To further strengthen the exoskeleton of the working section 32, two edge stiffeners 138 (see FIG. 1) and four diagonally extending side struts 140 are provided.

The transverse frames 132, the struts 136, 138, 140 and the ground engaging members 130 cooperate to define the exoskeleton which surrounds a generally open space within which a vertically movable housing assembly 142 is mounted. At each corner of the housing assembly 142 there is provided a vertically extending channel member 144 which is provided with a plurality of vertically spaced apart holes 146. Generally vertically extending hydraulic cylinders 148 on each side of the housing assembly 142 are connected at their cylinder ends to the exoskeleton surrounding the housing assembly 142 and are connected at the rod end to the lower edge of the housing assembly 142. With this connecting arrangement for the cylinders 148, maximum force is exerted to cause relative motion between the housing assembly 142 and the working section 32 while the force is also applied at the lowermost edge of the housing assembly 142. This point of force application is important because the housing assembly 142 defines the gaseous environment within which divers may work. Accordingly, the buoyancy of the housing assembly 142 acts to stabilize the vertically downward movement of the housing assembly when the cylinders 148 are attached at the lower edge thereof.

Housing Guiding and Latching Assembly

Turning now to FIG. 6, the housing guiding and latching assembly is illustrated more clearly. In particular, at each corner of the housing assembly 142 is a generally vertically extending channel member 144. To reduce the lateral clearance and provide guidance, each corner of the housing assembly 142 is further provided with a pair of vertically spaced apart bearing shoes 151, 152 (see FIG. 8). These bearing shoes 151, 152 are slidably received within the corresponding channel member 144 of the associated corner.

In order to fix the housing assembly 142 relative to the exoskeleton of the rig center section, each upper corner of the housing assembly 142 is provided with a locking assembly 150. As best illustrated in FIG. 7, each locking assembly 150 includes a pair of generally parallel plates 152, 154 which straddle one side leg of the associated channel member 144. When the housing assembly 142 has been positioned at the appropriate vertical location by the hydraulic cylinders 148, a suitable conventional bolt 156 is passed through the spaced plates 153, 154 and an aligned hole 146. A nut 158 is then threaded thereon. Accordingly, the hydraulic cylinders 148 are not required to maintain the housing 142 in its lowered configuration. Moreover, the locking bolt and nut 156,158 can be attached by attending personel along side the housing assembly so that an accidental loss of hydraulic pressure is unlikely to cause injury.

Manipulator Assembly

With reference to FIG. 8, each end wall of the housing assembly 142 is provided with a slot 160 positioned to overlie a conduit or conduit section. Adjacent each side of the slot are a pair of vertically extending guide tracks 162 that are generally parallel to one another. The guide tracks 162 support a vertically movable carriage assembly 164 (see FIG. 9) which may be mounted within the housing assembly 142. As best illustrated in FIG. 10, the vertically movable carriage 164 is provided with a pair of vertically extending channel members 166 and a pair of vertically extending block members 168. One channel member 166 and one block member 168 being on a corresponding side of the opening 160 and cooperating to define a corresponding recess that receives the lateral projections of the associated guide track 162. Cooperation between the guide tracks 162 and the receiving spaces is effective to control the vertically movable carriage 164 throughout its vertical travel.

To effect vertical movement of the vertically movable carriage 164 to the housing assembly 142 (see FIG. 9), an adjustment assembly 170 is provided. The adjustment assembly 170 may, for example, comprise a threaded shaft 172 which is journaled to the housing assembly 142 at its upper end 174 by a suitable conventional bearing 176. A threaded aperture 178 of the vertically adjustable carriage 174 receives the threaded shaft 172. As the threaded shaft 172 rotates, the journal mounting 176 at the fixed upper end 174 causes the carriage 164 move along the shaft 172 toward or away from the roof 180 of the housing 142, depending on the direction of shaft rotation. Limits of the adjustment are determined by the length of the threads on the shaft 172.

This vertically adjustable carriage 164 includes a pair of generally parallel horizontally disposed vertically-spaced guide surfaces 182, 184 that define a guide slot along which a generally horizontally movable carriage 186 is mounted for sliding movement. Cover plates 188, 190, 192 retain the horizontally adjustable carriage 186 generally within the guide slot of the vertically adjustable carriage 164.

To effect transverse movement of the horizontally adjustable carriage 186, a lateral adjustment assembly 194 is connected between the vertically adjustable carriage 164 and horizontally adjustable carriage 186. This adjustment assembly 194 includes a threaded shaft 196 which is journaled at one end 198 to the vertically adjustable carriage. The threaded shaft 196 itself is received by a corresponding threaded receptacle member 200 carried by the horizontally adjustable carriage 186. Rotation of the threaded shaft 196 will effect relative lateral movement of the horizontally adjustable carriage 186 with respect to the vertically adjustable carriage 164. The limits of horizontal adjustment are defined by the length of the threaded portion of the shaft 196.

It will be apparent that the manipulator assembly is capable of biaxial movement in relation to the axis of the rig both vertical axis and horizontal axis movement being possible transversely of any conduit.

Securing Assembly

The horizontally adjustable carriage 186 of each manipulating assembly is provided with the generally V-shaped downwardly facing opening 202 that has a bearing pad 204. While the central portion of the bearing pad 204 may be generally arcuate, any conduit to be handled by the manipulator assembly will generally have a nominal diameter exceeding the curvature of the arcuate portion. The opening 202 is narrower than the opening 160 of the housing and is adapted to receive a conduit or a conduit section.

Extending across the opening 202 and positioned below the center thereof is a transversely extending cross bar 206. This cross-bar 206 positively retains a conduit end in the horizontally adjustable carriage 186 of the manipulating assembly. To effect vertical adjustment of the cross bar 206, and accomodate various nominal conduit sizes without additional parts, a pivotal connection assembly 208, 210 is provided on each side of the opening 202. Each pivotal assembly 210 (FIG. 11) includes a plurality of outwardly projecting gudgeons 212 which define a plurality of spaces 214 therebetween. The vertical height of the spaces 214 is generally equivalent to the axial height of the gudgeons 212. It will be seen from FIG. 9 that the gudgeons 212 on one side of the opening 202 are in general horizontal alignment with the spaces 214' between gudgeons 212' on the opposite side of the opening 202.

Each end portion 216, 218 of the cross bar 206 has an ear that is received by a space between adjacent gudgeons 212, 212'. Each ear 216, 218 has an aperture which can be brought into alignment with apertures through the corresponding gudgeons 212, 212' so that a locking pin 220, 222 respectively can secure the cross bar 206 in a desired vertical location.

The cross bar 206 can be vertically adjusted to accomodate conduits of various nominal sizes by positioning it vertically in the spaces 214, 214' as desired. The vertical spacing between adjacent openings 214 may be defined as one vertical increment. As situations may occur in which it is convenient to raise the cross bar 206 by less than a full vertical increment, the cross bar 206 can be rotated about a longitudinal axis thereof so that the ear 218 is positioned, for example, in the same space 214, while the ear 216 is positioned in the vertically upwardly adjacent space 214'.

Each pivotal connection assembly 208, 210 is positioned laterally with respect to the opening 202. In this manner, the cross-bar can be swung into operative position beneath a conduit from a position along side. Thus, there is a little risk of injury to personnel should a conduit accidentally get loose.

Figure 14:
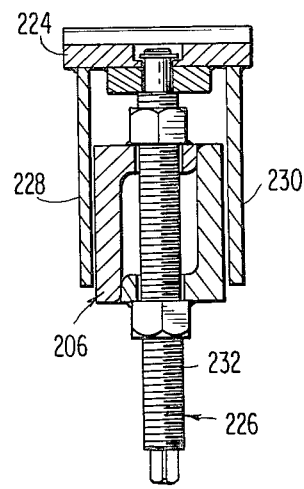
FIG. 14 is a partial cross-sectional view taken along the line 14—14 of FIG. 12.

Intermediate the end portions 216, 218 of the cross bar 206 is a conduit support pad 224 which is supported above the cross bar 206 by a threaded adjustment assembly 226. The pad 224 is located below the rig axis when the cross-bar is in supporting position so that three circumferential locations engage the conduit. Turning now to FIG. 14, the conduit support pad 224 is seen to include a pair of downwardly depending side portions 228, 230 which guide the pad 224 vertically in relation to the cross bar 206. The adjustment assembly 226 includes a threaded rod 232 journaled to the underside of the conduit support pad 224 and received by nuts suitably connected to the cross-bar so that rotation of the threaded rod 232 effects a fine scale vertical adjustment of the support pad 224.

Preferred Location of the Manipulating Assembly

Figure 12:
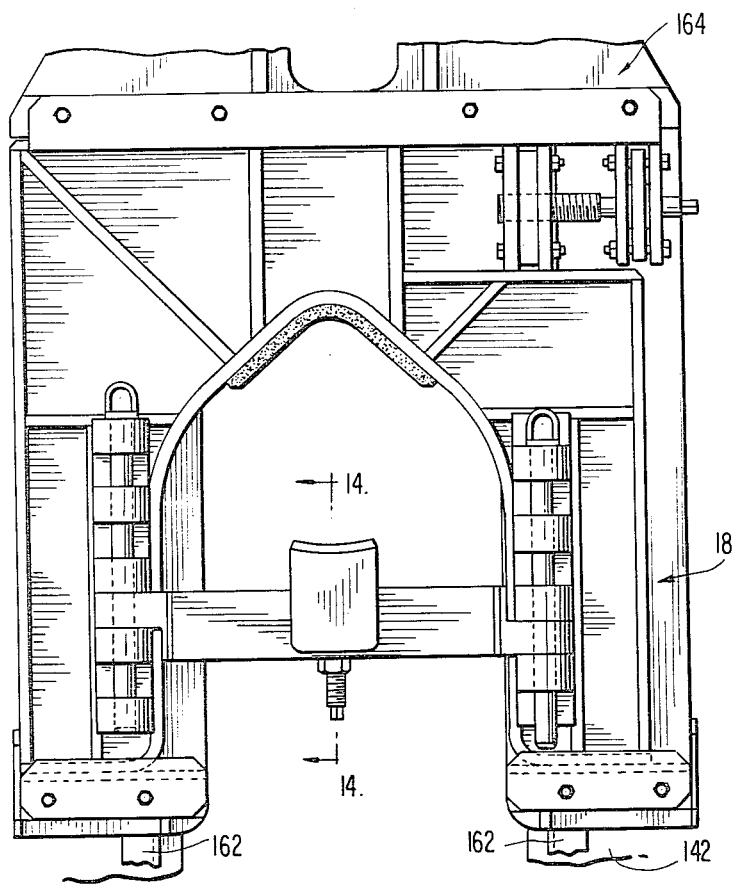
FIG. 12 is a detail view of an alternate embodiment of the location for the manipulating assembly.
Figure 13:
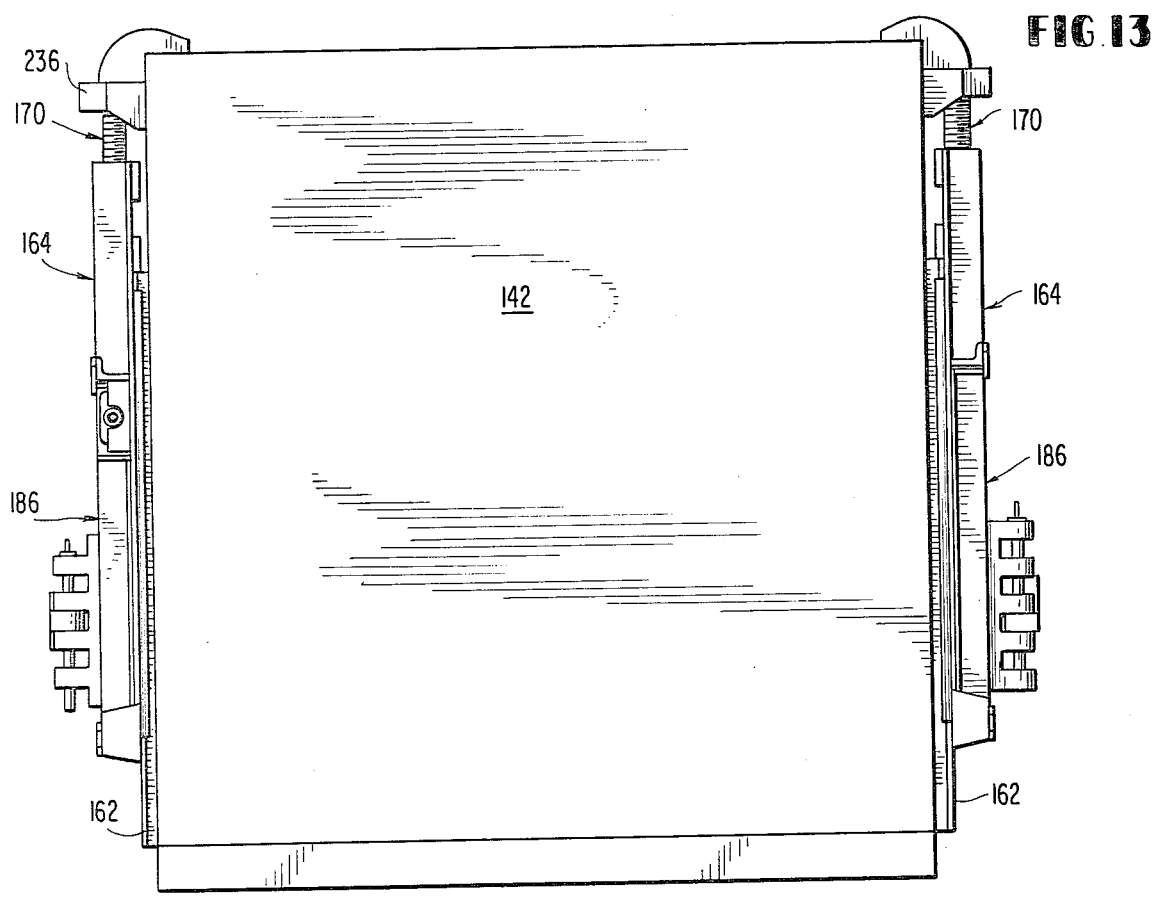
FIG. 13 is an enlarged elevational view of the central working section illustrating the manipulator assembly positioned externally of the housing assembly.

While the discussion above in connection with FIGS. 9, 10 and 11 has illustrated details of the manipulating assembly, the manipulating assembly can be located either externally or internally of the housing assembly 142. The preferred location of the manipulating assembly is exterior to the housing assembly 142, as illustrated in FIG. 12. In this connection, the upper end of the vertical adjustment assembly 170 (see FIG. 13) has a journal mounting 236 connected to the housing assembly 142 near its upper edge. The vertical guide tracks 162 are mounted on the external side surface of the housing assembly 162 to provide their intended function. One reason for preferring the manipulator assembly on the exterior of the housing assembly 142 resides in the fact that the manipulator assembly does not occupy valuable space inside the housing assembly 142.

Operation

In preparation for aligning two conduit sections, the locking and securing assemblies are prepared to receive a conduit of specific nominal size. This preparation includes approximately locating ears of the lock bar 102 (see FIG. 4) in spaces 110 of the pivot assemblies. The pin 120 is also removed to swing first and second portions 116, 118 aside and expose the notch 96.

Each manipulator assembly is also prepared by mounting the cross-bar 206 (see FIG. 9) in appropriate recesses 214,214' to accomodate conduit of the specific nominal size. One pin 220 or 222 may be removed so that the cross bar swings freely in a horizontal plane. In addition the vertically adjustable carriage 164 is centered on the shaft 172 and the horizontally adjustable carriage 186 is centered on the threaded shaft 196 of its adjustment assembly.

The foregoing procedures may be carried out on a tending surface vessel or underwater if necessary. In either event, the rig must then be lowered into position above the conduit sections, which position may be on the sea bed or suspended thereabove. The general lowering of a submarine pipeline alignment rig into engagement with a submerged conduit is discussed in detail in U.S. Pat. No. 3,641,777, which is expressly incorporated herein by this reference hereto as if fully set out herein.

Figure 15:
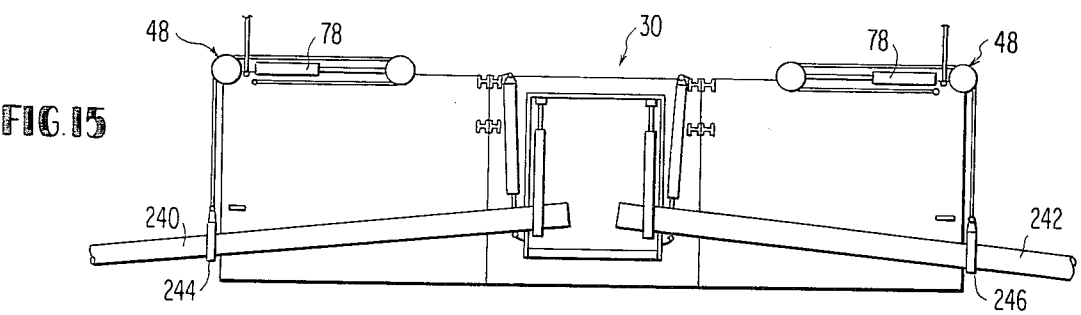
FIG. 15 is a schematic illustration of a pipeline lifting operation.

With the rig 30 (see FIG. 15) lowered into operative position above conduit sections 240, 242, slings 244, 246, respectively, are secured around the exposed ends of the conduit sections 240, 242. With each sling connected to a hoisting assembly of the corresponding truss section 34, the hydraulic cylinder 78 of each hoisting assembly 148 is actuated to raise the sling 244, 246 and the associated conduit 240, 242 into engagement with the V-shaped slot 96 (see FIG. 4) of the fulcrum assembly.

Then, the first and second portions 114, 116 of the lock bar 102 are swung under the respective conduit section and the clevis pin 120 inserted to secure the lock bar portions. The support pad 124 is then adjusted.

Figure 16:
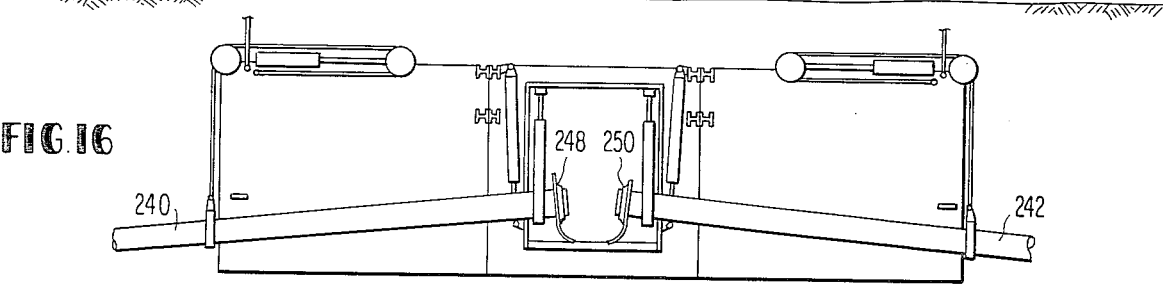
FIG. 16 is a schematic illustration of rig with housing seal connected to conduit sections.
Figure 17:
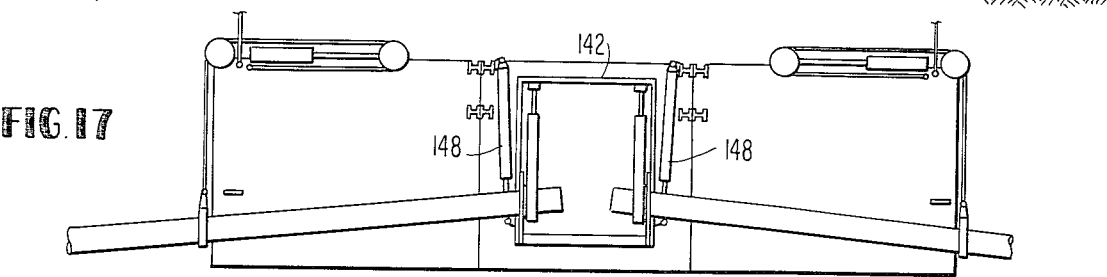
FIG. 17 is a schematic illustration of the rig with housing seals in place.

At this point a housing seal 248, 250 is positioned over the distal end of each conduit section 240, 242 (see FIG. 16). With the housing seals 248, 250, positioned, the seals are respectively attached to the side of the housing 142 (see FIG. 17). The details of the connection of the housing seals to a submerged housing is discussed in detail in U.S. Pat. No. 3,641,777 which is expressly incorporated herein by this reference thereto as though fully set forth herein.

With the seals 248,250 installed in the housing assembly 142, (see FIG. 17), The manipulator assemblies are attached to the corresponding conduit sections 240,242. To connect the manipulator, the cross-bar 206 (see FIG. 9) swings under the conduit section and is secured by inserting the hinge pin 220 or 222, as required. The support pad 224 is then raised into engagement with the conduit to securely hold it.

Figure 18:
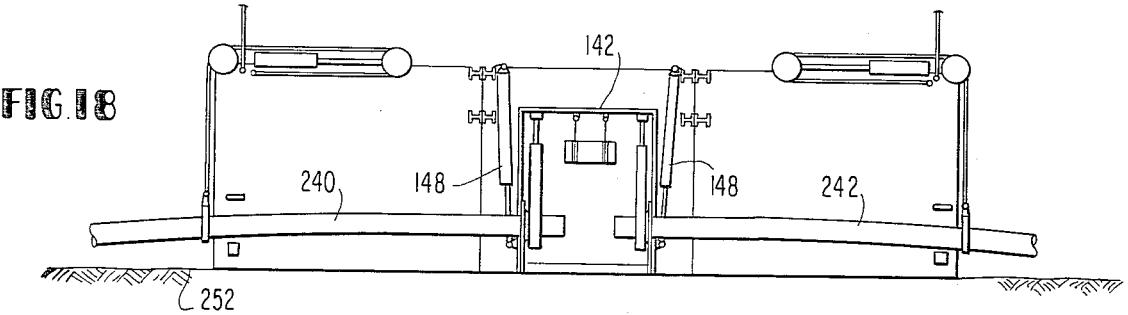
FIG. 18 is a schematic illustration of the rig with sections in aligned orientation.

Next, the rig 30 is lowered into contact with the sea bottom 252 if it is not already in contact therewith. Lowering of the rig 30 can thus effect some preliminary bending of the conduits (see FIG. 18). Then, the hydraulic cylinders 148 are extended to lower the housing assembly 142 and move the ends of the conduits 240, 242 into general alignment with one another. At this point, the horizontal and vertical adjustments of the housing manipulators are actuated to complete the alignment process.

Figure 19:
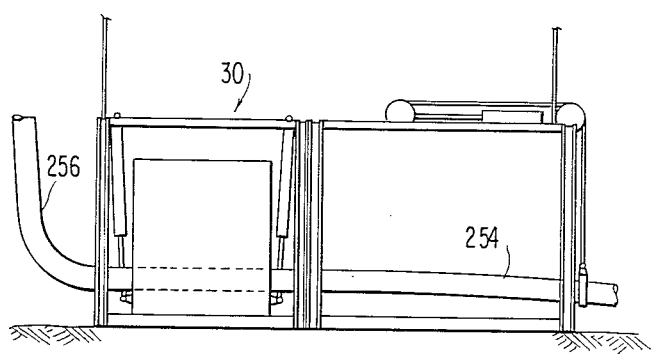
FIG. 19 is a schematic illustration of the rig with a truss section detached to accomodate positioning adjacent to a pipeline riser.

In those situations where the rig 30 must be lowered to effect connection of a pipeline 254 (see FIG. 19) to a riser 256 adjacent a submerged structure, one truss section may be severed or detached from the rig. In this fashion, the rig 30 can be positioned closely adjacent to the riser 256 while the remaining truss section engages the conduit section as described above. Manipulators of the housing assembly 142 can then effect adjustment and alignment between the riser 256 and the pipeline 254.

Figure 20:
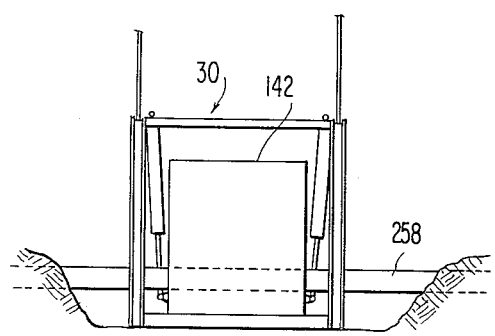
FIG. 20 is a schematic illustration of the rig with both truss sections detached to facilitate use on an existing conduit in a repair procedure.

In those situations where it is desired to repair an existing conduit or to make a lateral connection to an existing conduit pipeline 258 (FIG. 20) both truss sections of the rig 30 may be removed and the central working section of the rig 30 is then lowered into a straddling relationship with respect to a conduit 258. With the housing assembly 142 lowered into position, the manipulators hold the housing assembly to the conduit. Then, a gaseous environment is provided within the housing assembly in which the desired operation may be conducted.

Summary of Major Advantages

The detachable connection between the truss sections and the working section of the submarine pipeline alignment rig of the present invention permits the rig to be quickly broken down to effect a connection between a riser and a pipeline and to permit lateral taps, repairs, and the like, in existing conduits.

A multiplicity of nominal conduit sizes can be handled by the present invention without changing parts due to the conduit engagement assembly configurations. The arrangement therefore permits rapid accomodation of different conduit sizes if necessary and could even be used in connecting conduits of different nominal size.

Safety of servicing personnel is materially enhanced by the presence of mechanical members to prevent inadvertant release of the conduit from the rig. Moreover, these members can be connected by servicing personnel without getting beneath an elevated conduit section.

Biaxial adjustability of conduit sections is available by virtue of the manipulator assembly construction. This adjustability is in addition to the gross alignment effected by vertical movement of the housing assembly in conjunction with the pipe engaging slot configuration.

The rig of the present invention eliminates a pair of manipulators in comparison to preexisting rigs. This alone substantially reduces rig weight. However, further weight reduction is effected by lightening the supporting structure that is permissible when one pair of manipulators is discarded. Moreover, the detachability of the truss sections makes it possible to handle the rig in three comparatively small sections.

Many other advantages too numerous to list will be apparent to those skilled in the art from the foregoing discussion.

It will now be apparent that there has been provided in accordance with this invention a new and useful submarine pipeline alignment rig which overcomes deficiencies in the existing prior art. Moreover, it will be apparent to those skilled in the art that numerous modifications, variations, substitutions and equivalents exist for features of the present invention which do not materially depart from the scope thereof. Accordingly, it is expressly intended that all such modifications, variations, substitutions and equivalents which fall within the spirit and scope of the invention defined in the appended claims be embraced thereby.

What is claimed is:

1. Apparatus for working on conduit sections in a submerged location, comprising:
truss means having a fulcrum assembly adapted to engage a submerged conduit section a distance from said conduit's end and provide a fulcrum therefor about which said conduit section may pivot; and working means spaced from said fulcrum assembly for aligning of said conduit section, being detachably connected to the truss means and including housing means for containing a submerged gaseous environment into which said conduit section extends the housing means being vertically movable and carrying a pair of manipulating means for engaging and moving the conduit sections vertically and horizontally about said fulcrum to effect alignment within said housing means thereof.

2. The apparatus of claim 1 wherein the first-named truss means is attached to one side of the working means and a second truss means is attached to an opposite side of the structural means to provide a pair of spaced conduit fulcrums.

3. The apparatus of claim 1 wherein the truss means includes an inverted V-shaped notch for centering a submerged conduit relative to the truss means.

4. The apparatus of claim 1 wherein the truss means includes locking means for fixing the spatial relationship between the truss means and a submerged conduit while preventing accidental separation of the truss means and the conduit.

5. The apparatus of claim 4 wherein the locking means includes a lock bar and pivot means at each end of the lock bar for attaching the lock bar to the truss means.

6. The apparatus of claim 5 wherein the lock bar is U-shaped in elevation and includes first and second portions, the first and second portions being connectable by a transverse pin.

7. The apparatus of claim 5 wherein each pivot means provides incremental vertical adjustment of the lock bar relative to the truss means to accommodate conduits of various nominal sizes.

8. The apparatus of claim 7 wherein a support pad is carried by the lock bar and a continuous vertical adjustment means supports the pad relative to the lock bar, when the lock bar is positioned below a conduit the continuous adjustment means being operable to cause contact between the conduit and the truss means.

9. The apparatus of claim 1 further including hoisting means at the end of the truss means for causing relative vertical movement between the truss means and a submerged conduit.

10. The apparatus of claim 1 wherein the manipulating means causes relative movement between the housing means and the conduit along each of two transverse axes.

11. The apparatus of claim 10 wherein the axes are perpendicular.

12. The apparatus of claim 10 or 11 wherein the manipulating means includes securing means for positively fixing the conduit in position with respect to the manipulating means.

13. The apparatus of claim 12 wherein the second carriage has a V-shaped notch facing the conduit and the securing means includes a cross bar having two ends pivotally connected to the second carriage across the notch to prevent the submerged conduit from being unintentionally released from the manipulator means.

14. The apparatus of claim 13 wherein each end has an incrementally vertically adjustable pivot means for connecting the cross bar to the first carriage, the pivot means including a plurality of regularly spaced gudgeons defining a plurality of equally spaced slots to receive the cross bar end.

15. The apparatus of claim 14 wherein each cross bar end defines an ear sized to be received by the slots of the pivot means, the ear at one end of the cross bar being vertically offset from the ear at the other end, and the gudgeons of one pivot means being vertically offset from the gudgeons of the second pivot means so that intermediate vertical increments may be effected by turning the cross bar over.

16. The apparatus of claim 13 wherein the cross bar is provided with a conduit engaging seat and a continuous vertical adjustment means, the vertical adjustment means being connected between the seat and the cross bar and permitting further vertical adjustment of the seat between vertical locations set by the pivot means.

17. The apparatus of claim 10 wherein the manipulating means is positioned within the housing means to permit adjustment from within the housing means.

18. The apparatus of claim 10 wherein the manipulating means is positioned externally of the housing means to permit adjustment from the exterior of the housing means.

19. An apparatus for working on conduits in a submerged location, comprising:

working section means operable to align conduit sections;

truss means detachable connected with the working section means and operable to lift a conduit section;

the truss means including a fulcrum assembly for engaging said conduit section;

the working section means including;

frame means;

housing means for containing a submerged gaseous environment and for providing a submerged work space, and being movable relative to the frame, and said fulcrum assembly and manipulating means for engaging a submerged conduit section and causing relative movement between the housing means and the submerged conduit section along each of two axes, carried by the housing means and movable with respect thereto, spaced from said fulcrum assembly, and operable to pivot said conduit section about said fulcrum assembly and fix the relative position between the housing means and the submerged conduit section.

20. The apparatus of claim 19 wherein the manipulating means includes a first carriage slidably mounted on and vertically adjustable relative to the housing means.

21. The apparatus of claim 20 wherein the manipulating means includes a second carriage, slidably mounted on and horizontally adjustable relative to the housing means.

22. The apparatus of claim 20 wherein a second carriage is mounted on the first carriage so as to be bodily movable therewith and to be independently adjustable.

23. The apparatus of claim 21 or 22 wherein the manipulating means further includes a securing means for positively retaining the conduit in relation to the housing means.

24. The apparatus of claim 23 wherein the second carriage defines a generally V-shaped opening for receiving the submerged conduit and contacting it at two circumferentially spaced locations, and wherein the securing means includes a conduit engaging seat means for contacting the conduit at a third location circumferentially spaced from the first two locations.

25. The apparatus of claim 23 wherein the securing means includes a cross bar having connecting portions pivotally connected to the second carriage across the opening to prevent release of the submerged conduit from the manipulator means, a conduit engaging seat being carried by the cross bar.

26. The apparatus of claim 25 wherein the second carriage has a plurality of vertically spaced gudgeons defining spaces therebetween and each connecting portion of the cross bar is received by a corresponding space between gudgeons.

27. The apparatus of claim 26 wherein the connecting portions are vertically offset from each other, and the gudgeons on one side of the notch are vertically offset from one another so that intermediate vertical increments of the cross bar may be attained by rotating the cross bar 180° about a longitudinal axis thereof.

28. The apparatus of claim 24 wherein the seat is supported relative to the securing means by a vertical adjustment so as to accommodate conduits of varying nominal size.

29. The apparatus of claim 19 wherein the manipulating means is positioned externally of the housing means to permit adjustment from the exterior of the housing means and maximize the work area internally of the housing means.

30. Apparatus for aligning submerged conduit sections comprising:
   truss means including:
      hoisting means for lifting a conduit section into engagement with the truss means,
      fulcrum means providing conduit engaging contact surfaces about which said conduit section is pivotable, and
      locking means for avoiding inadvertant separation of the conduit section from the truss means; and
   working section means detachably connected to the truss means and including:
   frame means for connection with the truss means,
   housing means for containing a submerged working environment, being vertically movable relative to the frame means
   manipulating means spaced from fulcrum assembly for pivoting a distal end of the conduit section about said fulcrum assembly relative to the truss means, mounted on the housing means and operable to adjust the distal end along each of two axes transverse to the conduit section, and securing means for avoiding separation of the conduit section from the manipulating means.

* * * * *